United States Patent [19]

Majima et al.

[11] Patent Number: 5,000,521
[45] Date of Patent: Mar. 19, 1991

[54] VEHICLE BRAKING CONTROL APPARATUS

[75] Inventors: Yozo Majima, Kariya; Taro Tanaka, Nagoya; Masahiko Suzuki, Aichi; Kazuma Matsui, Toyohashi; Mitsuo Inagaki, Okazaki; Kenji Takeda, Aichi, all of Japan

[73] Assignees: Nippondenso Co., Ltd.; Nippon Soken, Inc., both of Aichi, Japan

[21] Appl. No.: 120,746

[22] Filed: Nov. 13, 1987

Related U.S. Application Data

[63] Continuation of Ser. No. 811,875, Dec. 20, 1985, abandoned.

[30] Foreign Application Priority Data

Dec. 25, 1984 [JP] Japan .................. 59-271829
Dec. 25, 1984 [JP] Japan .................. 59-271830
Feb. 7, 1985 [JP] Japan .................. 60-22317
Mar. 8, 1985 [JP] Japan .................. 60-46028

[51] Int. Cl.⁵ .................................. B60T 8/26
[52] U.S. Cl. .................................. 303/92; 303/119
[58] Field of Search .......... 303/116, 119, 96, 92, 303/115, 61; 310/328; 138/20; 188/181 A, 181 C

[56] References Cited

U.S. PATENT DOCUMENTS

| | | | |
|---|---|---|---|
| 3,520,576 | 7/1970 | Okamoto et al. | 303/61 |
| 3,549,211 | 12/1970 | Leiber | 303/119 |
| 3,551,764 | 12/1970 | Evans | 310/328 |
| 3,598,506 | 8/1971 | O'Neill | 310/328 |
| 3,667,813 | 6/1972 | Burckhardt et al. | 303/96 |
| 3,698,772 | 10/1972 | Nixon | 303/61 |
| 3,731,979 | 5/1973 | Mikaila | 303/119 |
| 3,825,307 | 7/1974 | Carr et al. | 303/92 |
| 4,090,739 | 5/1978 | Iio | 303/119 |
| 4,303,457 | 12/1981 | Johansen et al. | 138/26 |
| 4,456,309 | 6/1984 | Rath | 303/119 |
| 4,480,309 | 10/1984 | Burckhardt et al. | 303/96 |
| 4,602,702 | 7/1986 | Ohta et al. | 188/72.1 |

FOREIGN PATENT DOCUMENTS

0199352 11/1984 Japan .

OTHER PUBLICATIONS

"Four Years of Experience with 4-Wheel Antiskid Brake Systems (ABS)", Leiber and Czinczel, Society of Antomotive Engineers, Inc., 1983.

Primary Examiner—Alvin E. Oberley
Attorney, Agent, or Firm—Cushman, Darby & Cushman

[57] ABSTRACT

A wheel cylinder and brake piston are formed in the brake caliper of each wheel of a vehicle. A piezoelectric device, which is formed of laminated piezoelectric elements, is formed in the brake caliper such that it is connected with the wheel cylinder. By applying a voltage to the piezoelectric elements the piston device is made to expand and contract to thereby vary the volume of the wheel cylinder. Brake fluid is supplied from the master cylinder to the wheel cylinder via fluid passage formed in the brake caliper and a control valve for opening and closing this passage is formed in the passage. When there is a high pressure in the wheel cylinder, the piezoelectric device expands and the control valve closes. Then, by lowering the voltage the piezoelectric device contracts and the pressure in the wheel cylinder decreases.

5 Claims, 10 Drawing Sheets

VEHICLE BRAKING CONTROL APPARATUS

This is a continuation of application Ser. No. 811,875, filed Dec. 20, 1985, which was abandoned upon the filing hereof.

BACKGROUND OF THE INVENTION

This invention relates generally to a braking control apparatus for a vehicle such as an automobile and particularly to a control apparatus whose braking force is minutely controlled electronically, and which, when slippage occurs between the wheels and the road surface, automatically performs antiskid control by suitably reducing the force acting on the wheels when the wheels lock up.

Brake fluid is discharged from the master cylinder and is supplied to the individual wheel cylinders when the brake pedal is depressed. The wheel cylinders act on the brake pistons through the hydraulic pressure of the brake fluid and the brake pistons stop the rotation of the brake discs provided concentrically to each wheel.

With this type of control apparatus, the wheels lock up when a large force is applied to the brake pedal to bring the automobile to an abrupt stop. When the wheels lock up, slippage between the wheels and the road surface occurs resulting in a loss of control and unstable operation of the automobile. Accordingly, for smooth control of the automobile it is necessary for the operator to prevent this lock up of the wheels by detecting when slippage is about to occur and then reducing the force acting on the wheels.

It is however difficult to safely control the braking force as this depends on the sensory perception of the operator. An automatic control apparatus that operates based on a running state detection signal has been strongly desired.

A conventional apparatus that has a control device for reducing the pressure of the brake fluid supplied to each wheel cylinder is well known as a means for preventing wheel lock up. When lock up is detected from the change in wheel rotation speed signal, etc., an electromagnetic valve is operated to reduce the brake fluid supplied to the wheel cylinders.

However, with this kind of control apparatus there is an increase in the piping required to supply brake fluid from the electromagnetic valve to the wheel cylinders and, because of the compressability of the brake fluid, it is necessary to control a large volume of fluid, which in turn results in the need for a large capacity electromagnetic valve and hydraulic pump. This means that the apparatus is large and complicated, and it is difficult to improve the responsiveness of the apparatus.

SUMMARY OF THE INVENTION

In consideration of the above, it is an object of this invention to provide a vehicle braking control apparatus which is simple and compact, which can minutely control the braking force acting on the wheels, and which can automatically and with good response release the braking force when the wheels lock up.

It is another object of the invention to provide a vehicle braking control apparatus which minutely varies the braking force to suitably control the occurence of slippage between the wheels and the road surface to thereby provide a superior braking effect.

It is another object of the invention to provide a vehicle braking control apparatus which can exert a braking force on the vehicle such that lateral vibrations resulting from the wind, for example, can be prevented.

It is another object of the invention to provide a vehicle braking control apparatus which can indicate to the operator the operating state of the apparatus for reliable monitoring.

In the apparatus of this invention a piston device that uses a piezoelectric element is provided for the brake piston of a wheel cylinder. When the brake is operated and the wheels lock, the supply of brake fluid from the master cylinder to the wheel cylinder is cut off by a control valve. The voltage to the piezoelectric element is controlled to drive the piston device and increase or reduce the brake fluid pressure inside the wheel cylinder.

Accordingly, with this kind of braking control device it is possible to minutely control the brake fluid pressure in the wheel cylinder by using a control valve provided in a passage connected to the cylinder, and using a piston device comprising piezoelectric elements. As this passage has a very restricted volume it is possible to control the fluid pressure acting on the brake piston by controlling the voltage applied to the piezoelectric element of the piston device which expands and contracts corresponding to this voltage. The braking force acting on the wheels can therefore be controlled by a voltage signal, and this makes possible a very responsive braking control apparatus.

When the wheels of the car lock up, the control valve closes to decrease the volume in the wheel cylinder and thereby increase the responsiveness, so that when the piston device is contracted by the supply of a suitable voltage signal, the brake fluid pressure can be minutely decreased to reduce the braking force and unlock the wheels.

BRIEF DESCRIPTION OF THE DRAWINGS

This invention may be better understood with reference to the drawings in which.

DETAILED DESCRIPTION OF THE PREFERRED EMBODIMENTS

When the operator presses the brake pedal, brake fluid is discharged from the master cylinder and distributed to the wheel cylinders of the four wheels of the vehicle. The rise in pressure of the brake fluid in the wheel cylinders operates the brake piston to brake the wheels.

Figure 1:
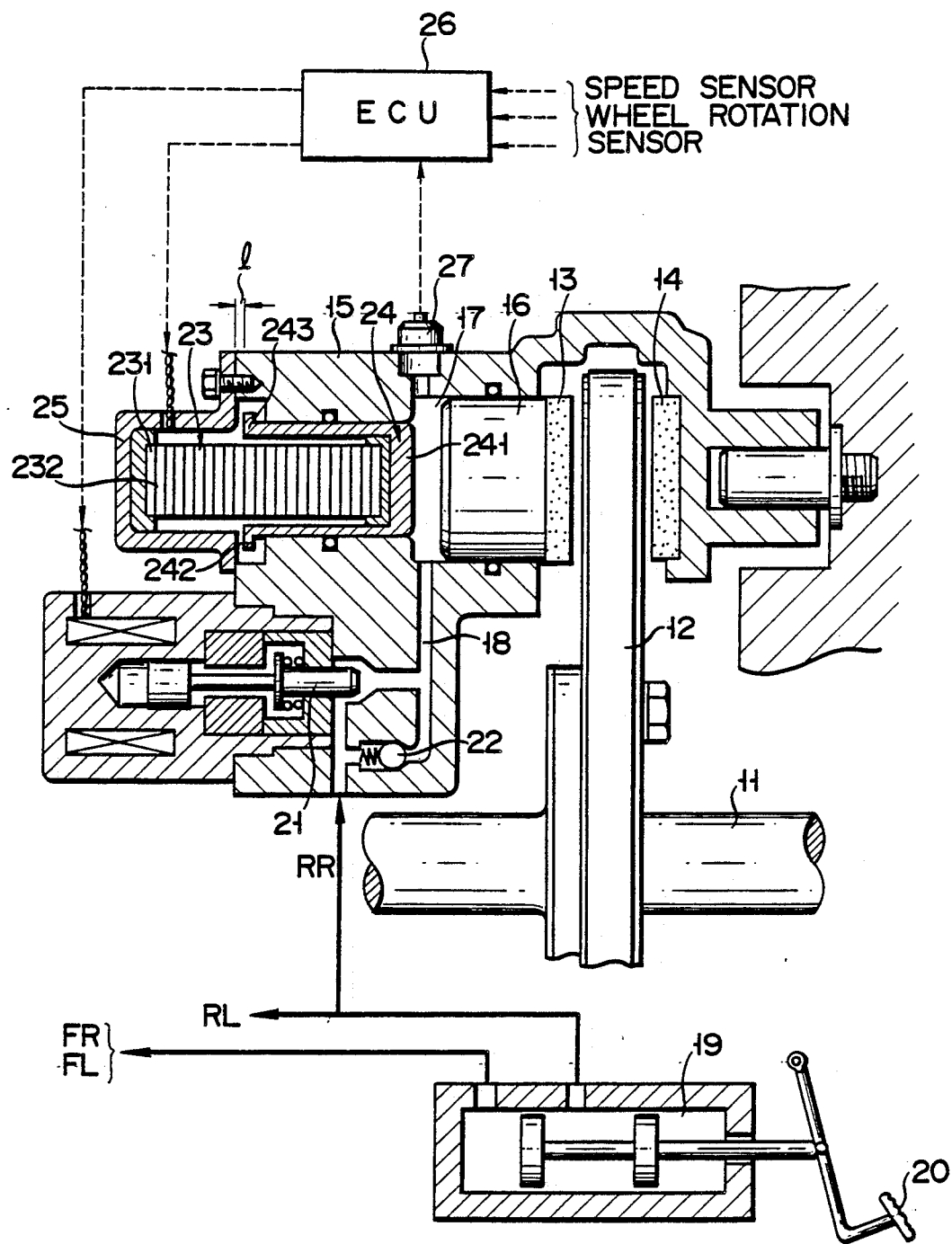
FIG. 1 is a cross section of part of the braking control apparatus of this invention according to a first embodiment as applied to one wheel.

In FIG. 1 shows the braking device for the right rear (RR) wheel only, but the device is the same for the other wheels as well.

Brake disc 12 is concentrically attached to wheel axel 11 and is sandwiched by inner pad 13 and outer pad 14 which are attached to brake caliper 15. Inner pad 13 is attached to brake piston 16 so that when brake piston 16 moves, inner pad 13 comes into contact with brake disc 12 which is pressed against outer pad 14, thereby exerting a braking force on brake disc 12.

Brake piston 16 slides in the axial direction within wheel cylinder 17 and inner pad 13 attached to it is normally separated from brake disc 12. When, as a result of the operation of brake pedal 20, fluid is supplied to wheel cylinder 17 through fluid passage 18 and a brake hose that couple wheel cylinder 17 with master cylinder 19, the pressure of the fluid moves brake piston 16 and thereby a braking force corresponding to the force exerted on the pedal is exerted against brake disc 12.

Brake fluid passage 18 is formed inside brake caliper 15 and has a constant volume that does not vary with the fluid pressure, etc. Control valve 21 is provided in this fluid passage 18. Control valve 21 normally is open and is driven to close fluid passage 18 by supplying a current to an excitation coil to thereby cut off wheel cylinder 17 from the brake fluid hose and master cylinder 19. When fluid passage 18 is closed by control valve 21 a space of restricted volume is formed.

A fluid passage equipped with a check valve 22 is formed in brake caliper 15 to act as a bypass for control valve 21. Check valve 22 is constructed so as to permit the flow of fluid only in the direction from wheel cylinder 17 to master cylinder 19. When the fluid pressure in wheel cylinder 17 is higher than in master cylinder 19, brake fluid is discharged from wheel cylinder 17 through this valve to master cylinder 19 until the pressure is equalized.

Piezoelectric device 23, which is integrally constructed of a plurality of thin plates of laminated piezoelectric elements 231, 232, ... held by an elastic sheet made of rubber, for example, is provided inside wheel cylinder 17.

Piezoelectric device 23 is provided coaxially with wheel cylinder 17 and piezoelectric elements 231, 231, ... are laminated and provided inside casing 25 along this axis as well. Movable body 24, which has working surface 241, cylindrical portion 242 covering piezoelectric device 23 and lip 243 on the cylindrical portion, is provided on the portion of piezoelectric device 23 that faces wheel cylinder 17. Clearance is provided between lip 243 and the inside surface of caliper 15 and movable body 24 is pushed from the wheel cylinder 17 side within this clearance.

As cylindrical portion 242 of movable body 24 is wrapped around piezoelectric device 23, when it expands, movable body 24 is pushed into wheel cylinder 17 and movable body 24 is pushed in the direction of piezoelectric device 23 by the pressure of the brake fluid in wheel cylinder 17 to thereby alter the interior volume of wheel cylinder 17. Piezoelectric device 23 and movable body 24 constitute the piezoelectric piston device.

Piezoelectric elements 231, 232, ..., of which piezoelectric device 23 is constructed, have electrode plates (not shown) interleaved between and to which they are connected in parallel. Power is supplied to these electrodes from engine control unit 26. When a high voltage is supplied from control unit 26 to piezoelectric elements 231, 232, ..., they expand pushing movable body 24 into wheel cylinder 17 and, when a low voltage is supplied, movable body 24 contracts out of wheel cylinder 17. The volume of the space inside wheel cylinder 17 is therefore controlled by the value of the voltage supplied to piezoelectric device 23.

Engine control unit 26, to which signals from surface speed sensor and wheel rotation speed sensor are supplied, controls the excitation current supplied to the excitation coil of control valve 21. An ultrasonic sensor, for example, may be used as the surface speed sensor. Wheel lock-up resulting in slippage is detected based on the data supplied from these sensors, and an excitation current is supplied to control valve 21 to close passage 18. Also, a pressure sensor 27 is provided inside wheel cylinder 17 to supply control unit 26 with a wheel-cylinder pressure signal.

Although not shown, the same control devices are provided for each of the wheels of the vehicle and the supply of brake fluid from master cylinder 19 to each wheel cylinder is carried out in parallel. The control of the control valve and the piezoelectric device is performed independently for each wheel.

With a control device constructed in this way, control valve 21 normally is open so that the state of piezoelectric device 23 is irrelevant to the supply of brake fluid from master cylinder 19 to wheel cylinder 17.

Slippage of the wheels on the road surface as a result of wheel lock up is detected by control unit 26 which then supplies a high voltage to piezoelectric device 23 of the braking device on the wheel where slippage has occurred, and piezoelectric device 23 expands, moving movable body 24 into wheel cylinder 17. Then control valve 21 is driven to close passage 18, so that the brake fluid in wheel cylinder 17 is closed off at the pressure set by the operation of brake pedal 20.

When the voltage to piezoelectric device 23 is switched to low level, the device contracts drawing movable body 24 out of wheel cylinder 17 reducing the brake fluid pressure in wheel cylinder 17 and reducing the braking force acting on brake disc 12. This unlocks the wheel and ends the slippage.

Figure 2:
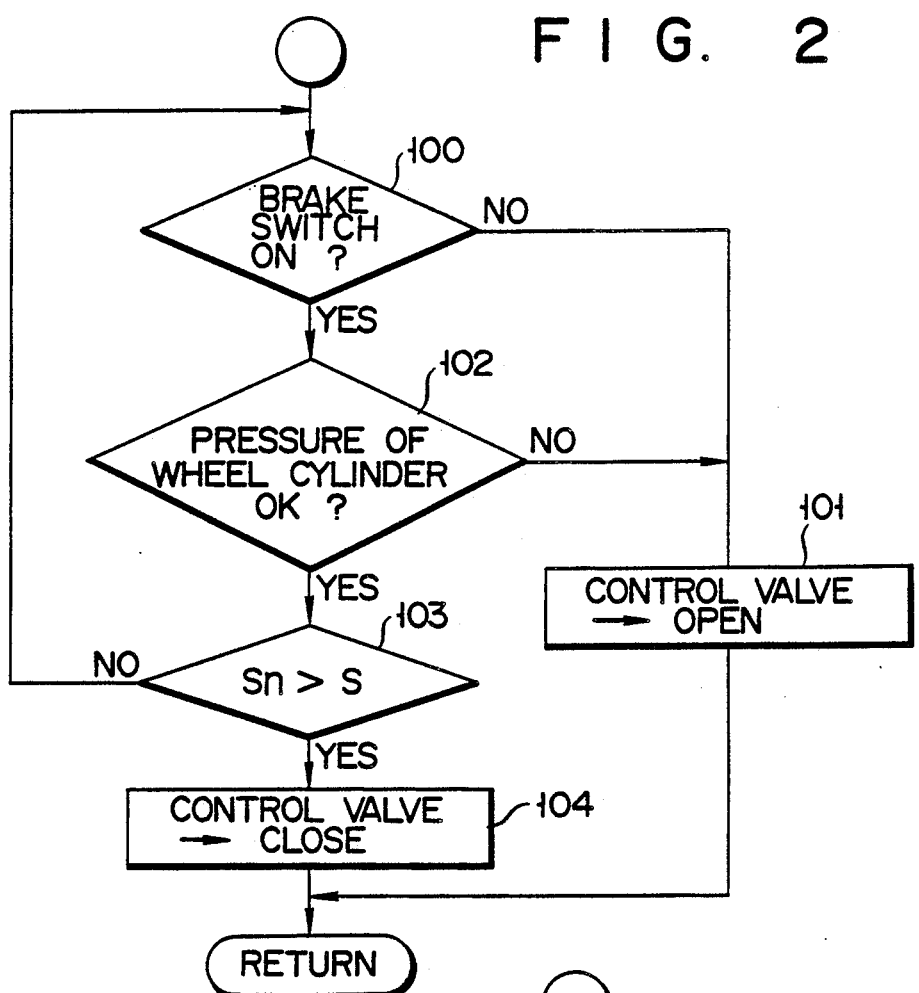
FIGS. 2 and 3 are flowcharts of the control operation of the switching control valve of the control apparatus.

FIG. 2 shows the control flow of the braking device. In step 100 it is determined whether the brake switch as a result of the operation of brake pedal 20 is on or not, and, if not, control goes to step 101 where control valve 21 is opened.

If it is determined that the brake switch is on, i.e., brake pedal 20 has been operated, control advances to step 102 where, based on the detection signal from pressure sensor 27, it is determined whether or not brake fluid pressure generated in wheel cylinder 17 is normal or not. If it is not, control goes to step 101 where control valve 21 is opened.

If it is determined in step 102 that the pressure is normal, control advances to step 103 where slip value Sn is calculated based on the vehicle-to-surface speed and the wheel rotation speed, and it is determined whether this value Sn is larger than a reference slip value S. If the value Sn is larger, it is determined that the wheel is locked and control advances to step 104, where control valve 21 is operated to close fluid passage 18 and make the space in wheel cylinder 17 independent.

Accordingly, when, in this state, the voltage supplied to piezoelectric device 23 is switched to the low state and piezoelectric device 23 contracts, the pressure inside wheel cylinder 17 decreases, the pressure on wheel piston 16 decreases and the wheel is freed.

Figure 3:
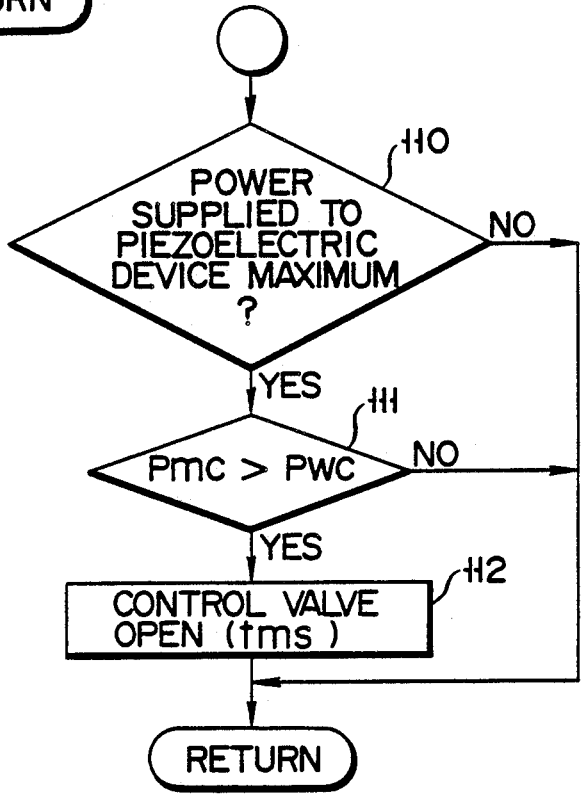

With fluid passage 18 closed off by control valve 21, the brake fluid pressure in wheel cylinder 17 is compared with the fluid pressure in master cylinder 19. As shown in FIG. 3, in step 110 it is determined whether the maximum voltage is being applied to piezoelectric device 23, i.e., it is determined whether the piston device, which is comprised of piezoelectric device 23, decreased the volume of wheel cylinder 17 to the minimum or not. If the answer is yes in step 110, control advances to step 111 and the fluid pressure Pmc in master cylinder 19 is compared with fluid pressure Pwc in wheel cylinder 17. If Pmc is larger than Pwc, control advances to step 112 where control valve 21 is opened for time period tms so that the fluid pressure in wheel cylinder 17 is set by the pressure in master cylinder 19.

When, with fluid passage 18 closed by control valve 21, pressure Pmc in master cylinder 19 becomes less than pressure Pwc in wheel cylinder 17 as a result of relaxation of brake pedal 20, brake fluid in wheel cylinder 17 flows to the master cylinder 19 side via check valve 22 to release the strong braking force.

In this way the value of the voltage applied to piezoelectric device 23 is controlled while fluid passage 18 is closed off by control valve 21. As was mentioned earlier, in the initial state of closure of control valve 21 a high voltage is applied to piezoelectric device 23 and the piston device extends into wheel cylinder 17 to the maximum extent. Then, when the voltage is switched to low, the braking force is reduced and the wheel unlocked. After the locked wheel has been released, the voltage is once more increased to increase the braking force. In this way, while monitoring the slippage between the wheel and the road surface, the voltage is varied to provide the most effective braking control.

Figure 4:
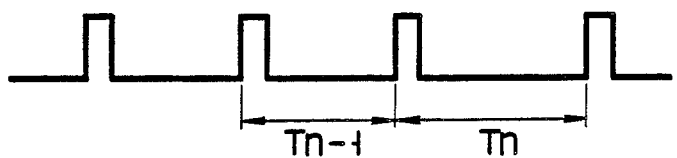
FIG. 4 shows the wheel rotation speed detection signal on which detection of slippage is based.

FIG. 4 shows the pulse signal output by wheel rotation speed detecting means at every determined rotation angle of the wheel. The generation gap of the pulse signal corresponds to the speed of rotation so that if the generation gap is Tn, for example, the rotation speed of the wheel Vwn can be expressed as follows $$Vwn = 1/Tn$$

It is therefore possible to detect slippage by monitoring changes in the rotation speed in relation to the surface speed of the vehicle. To be more precise, slippage can be determined by the change ratio of wheel rotation speed Vwn detected in the current sampling period and the wheel rotation speed $V_{wn-1}$ detected in the previous sampling period. The wheel rotation speed change ratio corresponding to this sampling ratio can be expressed by the following equation:

$$Sn = (V_{wn-1} - V_{wn})/V_{wn-1}$$
$$= (Tn - T_{n-1})/Tn$$

therefore, $$Tn(1-Sn) = T_{n-1}$$

$$Tn = T_{n-1}/(1-Sn)$$

$$\Delta T = Tn - [T_{n-1}/(1-Sn)]$$

When $\Delta T > 0$, it is determined that slippage is occurring and the voltage to piezoelectric device 23 is reduced in the period $\Delta T$ such that the pressure in wheel cylinder 17 is reduced. When $\Delta T < 0$, it is determined that slippage is not occurring and the voltage to piezoelectric device 23 is increased in the period $\Delta T$ to increase the brake fluid pressure in wheel cylinder 17. When $\Delta T$ approaches 0, pressure control is not performed by piezoelectric device 23 so that the pressure inside wheel cylinder 17 remains the same at that time.

Figure 5A:
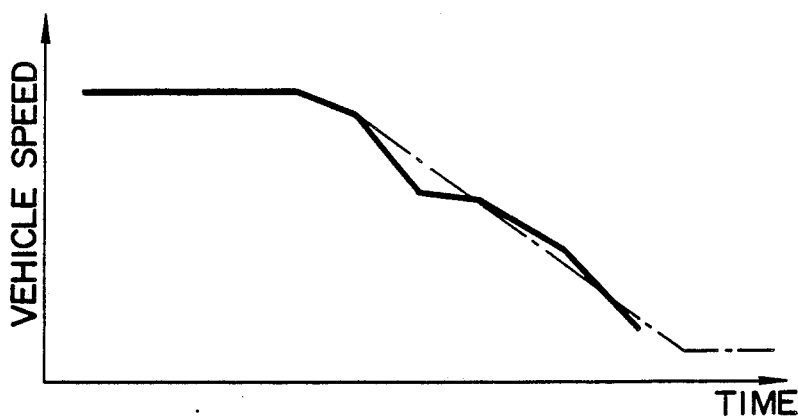
FIGS. 5A to 5D show the control operation of the apparatus.

FIGS. 5A to 5D show the relative relationship of the vehicle surface speed and the control of the brake fluid pressure in wheel cylinder 17 by the piston device of piezoelectric device 23. FIG. 5A shows the change in surface speed of the vehicle, the solid line showing the actual speed of the vehicle and the broken line showing the reduced speed that is aimed for.

Figure 5B:
Figure 5C:
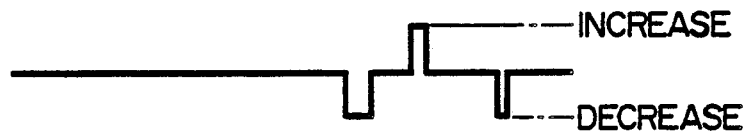

The pulse signal which expresses the rotational speed of the wheel corresponding to this change in speed of the vehicle is generated as shown in FIG. 5B. Based on the interval of this pulse signal, it is determined whether the wheel is locked, and the fluid pressure in wheel cylinder 17 is increased or decreased by piezoelectric device 23, as shown in FIG. 5C.

Figure 5D:

FIG. 5D shows the rise in brake fluid pressure in wheel cylinder 17 resulting from operation of brake pedal 20. Then, when the wheel starts to slip, this slippage is detected by the change in the wheel rotation speed and switching control valve 21 and piezoelectric device 23 perform their control functions; the fluid pressure is reduced and increased in that particular wheel cylinder 17 so that vehicle speed is reduced at the desired rate and without unnecessary slippage.

The occurrence of wheel slip is monitored and controlled by the braking device of each wheel.

In the normal state, where there is no wheel slip, the brake fluid pressure in wheel cylinder 17 increases together with the increase in pressure in master cylinder 19 as the result of operation to brake pedal 20 and braking occurs. If for any reason piezoelectric device 23 is damaged, normal braking can be performed with wheel cylinder 17 and master cylinder 19 alone. Even if, for example, piezoelectric elements 231, 232, . . . are damaged, lipped portion 243 of movable body 24 restricts its movable range so normal braking can still be performed.

The braking control apparatus of this invention does not only have an antilock function, but may also be used as an automatic braking device for when the vehicle is stationary, for example. In this case, when it is detected that the accelerator is not operated and that the vehicle speed is zero, control valve 21 is closed and a high voltage is supplied to piezoelectric device 23 so that movable body 24 moves into wheel cylinder 17 to increase the fluid pressure acting on brake piston 16.

Figure 6:
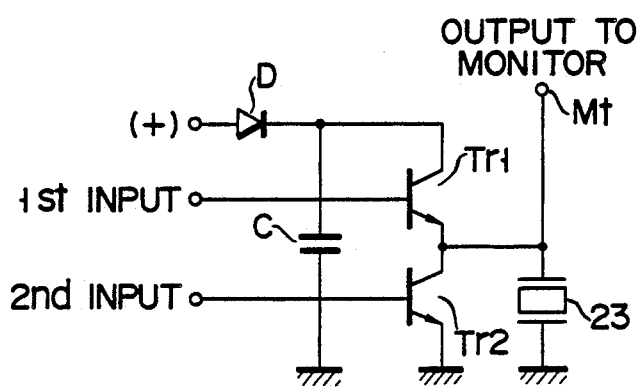
FIG. 6 is a circuit diagram of the voltage supply for the piezoelectric element comprising the piston device of the control apparatus.

With this kind of braking apparatus it is very effective to be able to at all times monitor whether piezoelectric device 23 is operating normally or not. FIG. 6 shows a power source control circuit for supplying the control voltage to piezoelectric device 23, which is constructed of laminated piezoelectric elements 231, 232, . . . Capacitor C is charged by power (+) via diode D. For this power source, a power source device which uses the voltage of the device which increases the battery voltage or another electrical device that generates voltage may be used. This power source (+) has a voltage high enough to sufficiently expand the piezoelectric elements and the capacitor is charged with the high voltage.

Capacitor C is discharged via transistors Tr1 and Tr2, and a first and second control input signal is supplied to the bases of the respective transistors to turn them on. When only the first control input signal is supplied to turn on transistor Tr1, the discharge voltage from capacitor C is supplied to piezoelectric device 23. Piezoelectric device 23 expands reducing the volume. When the second control input signal is supplied to transistor Tr2 to turn it on, the terminals of piezoelectric device 23 are short circuited so that the voltage drops to zero and the device contracts thereby increasing the volume of wheel cylinder 17.

As piezoelectric device 23 is provided inside wheel cylinder 17, fluid pressure acts on the device resulting in the generation of voltage corresponding to the pressure in the cylinder. This voltage is output via monitor terminal Mt and supplied to control unit 26, for example, as a monitor output signal. By observing this monitor output it is possible to confirm the normal operation of piezoelectric device 23.

When the brake fluid in wheel cylinder 17 is high as a result of operation of brake pedal 20, a voltage signal is produced by the piezoelectric devices of each of the wheels and compared with a preset value to determine the presence of an abnormality in each of the braking devices.

Figure 7:
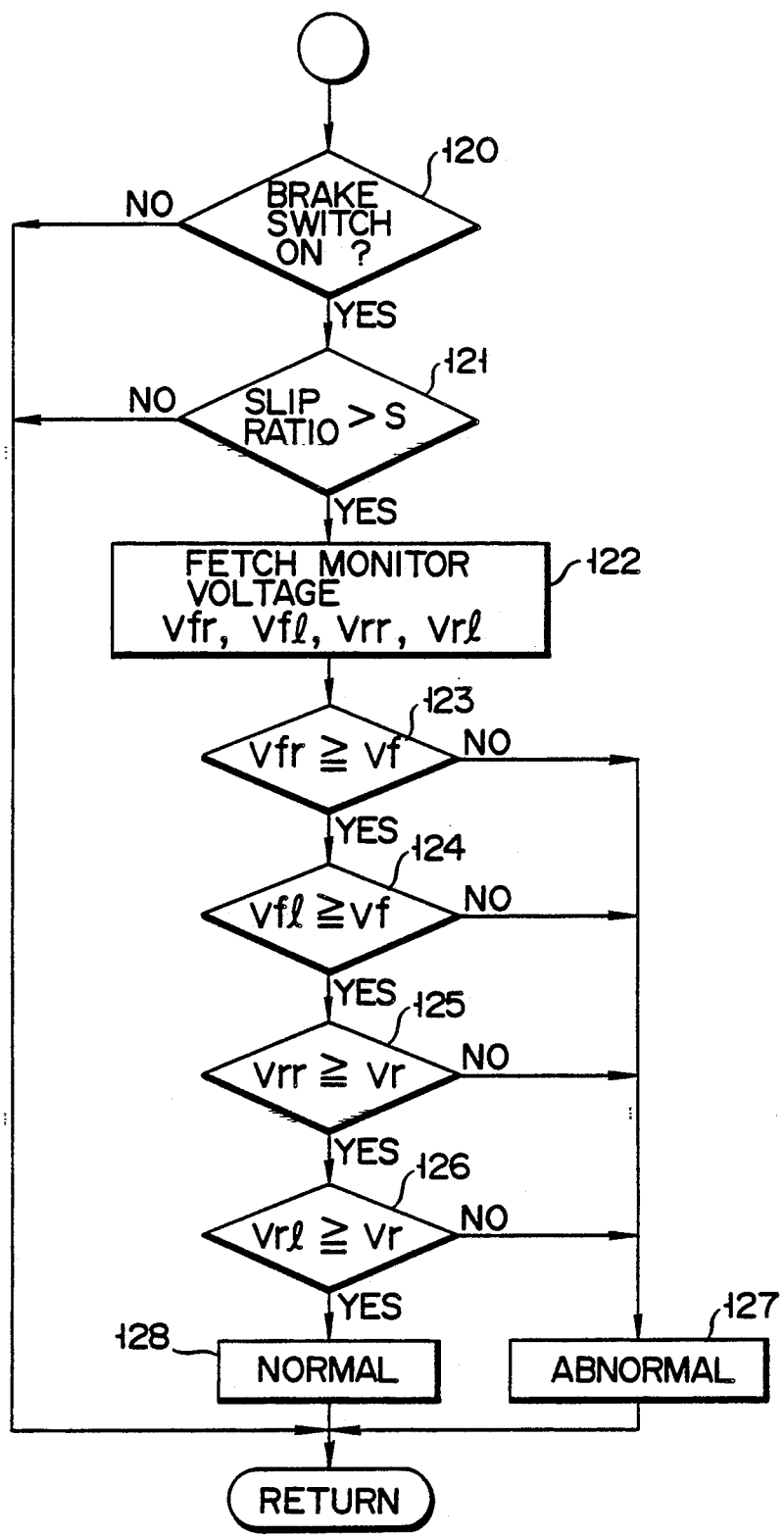
FIG. 7 is a flowchart showing the operation of the monitor means of the piezoelectric device.

FIG. 7 shows the operation flow of abnormality determination means of piezoelectric device 23, which is provided in control unit 26, for example. In step 120 it is determined whether the brake switch is on. If it is determined that brake pedal 20 has been operated and that the brake switch is on, control advances to step 121, where it is determined whether the slip ratio is larger than set value S and whether sufficient brake fluid is supplied to wheel cylinder 17. If sufficient fluid is being supplied, control advances to step 122, where the monitor voltages Vfr, Vfl, Vrr, Vrl are fetched from the braking device of each wheel.

In the following steps 123 to 126 the monitor values are compared with the set front and rear wheel values Vf and Vr and, if the monitor values are less than the set values, control goes to step 127 where it is determined that an abnormality exists. If all the monitor values are larger, however, than the set values, control goes to step 128 where the abnormality decision is cancelled and the normal operating state is confirmed.

In the above example, even if only one of the piezoelectric devices has an abnormality, a state of abnormality is determined for all the devices. However, when an abnormality is detected in only one braking device, it is possible for the abnormal state to be determined for that particular braking device only. Then, if an abnormal state is determined in two or more braking devices, it is determined and monitored that it is impossible to brake using the piezoelectric devices.

Figures 8, 9A, 9B, 9C, 9D:
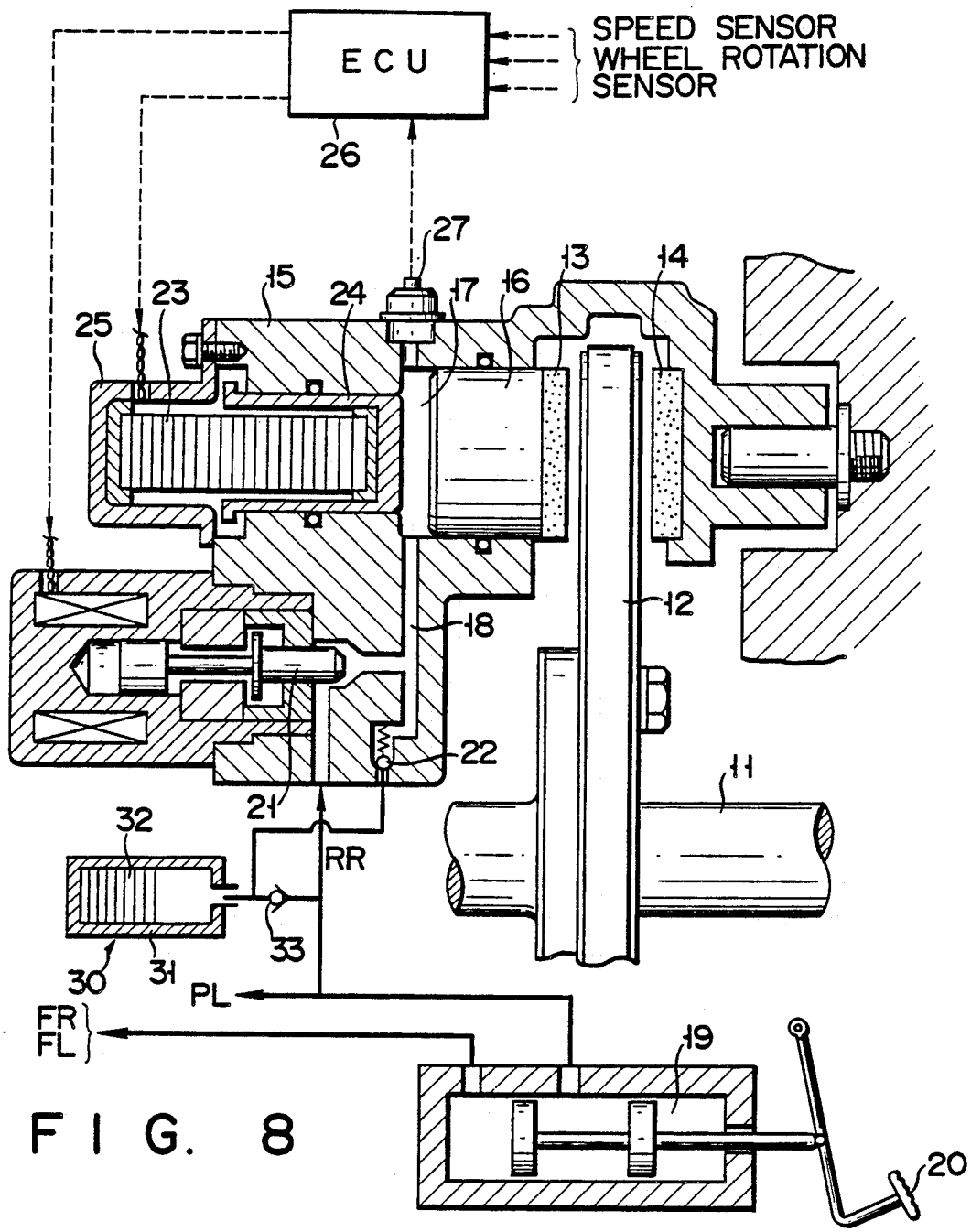
FIG. 8 is a cross section of the control apparatus according to a second embodiment of the invention.
FIGS. 9A to 9D are time charts showing the operation of the above embodiment of the invention.

FIG. 8 shows a second embodiment of the invention in which brake fluid is supplied from piezoelectric pump 30 to check valve 22. Piezoelectric pump 30 is provided in a sealed container 31 and comprises a plurality of laminated piezoelectric elements 32. The inside of container 31 is coupled with the brake fluid line from master cylinder 19 via check valve 33.

Check valve 33 allows fluid to pass from the line but not to the line. A pulse voltage signal is supplied to piezoelectric elements 32 from control unit 26. The other parts of this embodiment being the same as that in FIG. 1, the same reference numerals have been given to the same parts and a description of which has been omitted.

When, for example, a wind blows horizontal to the direction of travel of the vehicle, the vehicle is pushed to the side and this is detected by a roll sensor mounted on the vehicle. More precisely, when the vehicle is pushed to the side without the steering wheel being operated, the roll sensor sends out a detection signal such as that shown in FIG. 9A. When this detection signal is output, it is necessary to correct the roll, and this is performed by applying a braking force on the left side wheels by closing control valve 21 of the left side braking devices, as is shown in FIG. 9B. In this state, a pulse drive voltage such as that shown in FIG. 9C is supplied to piezoelectric elements 32 of pump 30 to expand and contract the elements.

Whe piezoelectric elements 32 are expanded and contracted, brake fluid is allowed in via check valve 33 from the brake fluid line connected to master cylinder 19. This brake fluid is then sent to wheel cylinder 17 via check valve 22. This expanding and contracting action of piezoelectric pump 30 accordingly results in an increase in the pressure in wheel cylinder 17 which in turn causes brake piston 16 to exert a braking force such as that shown in FIG. 9D on the wheels to prevent shaking and maintain a straight line of travel.

When a difference is detected in the rotation speed of the left and right drive wheels at low vehicle speed and with the steering angle nearly straight ahead, it is determined that the vehicle is not moving straight ahead and braking is effected on the pertinent side of the vehicle.

Figure 10:
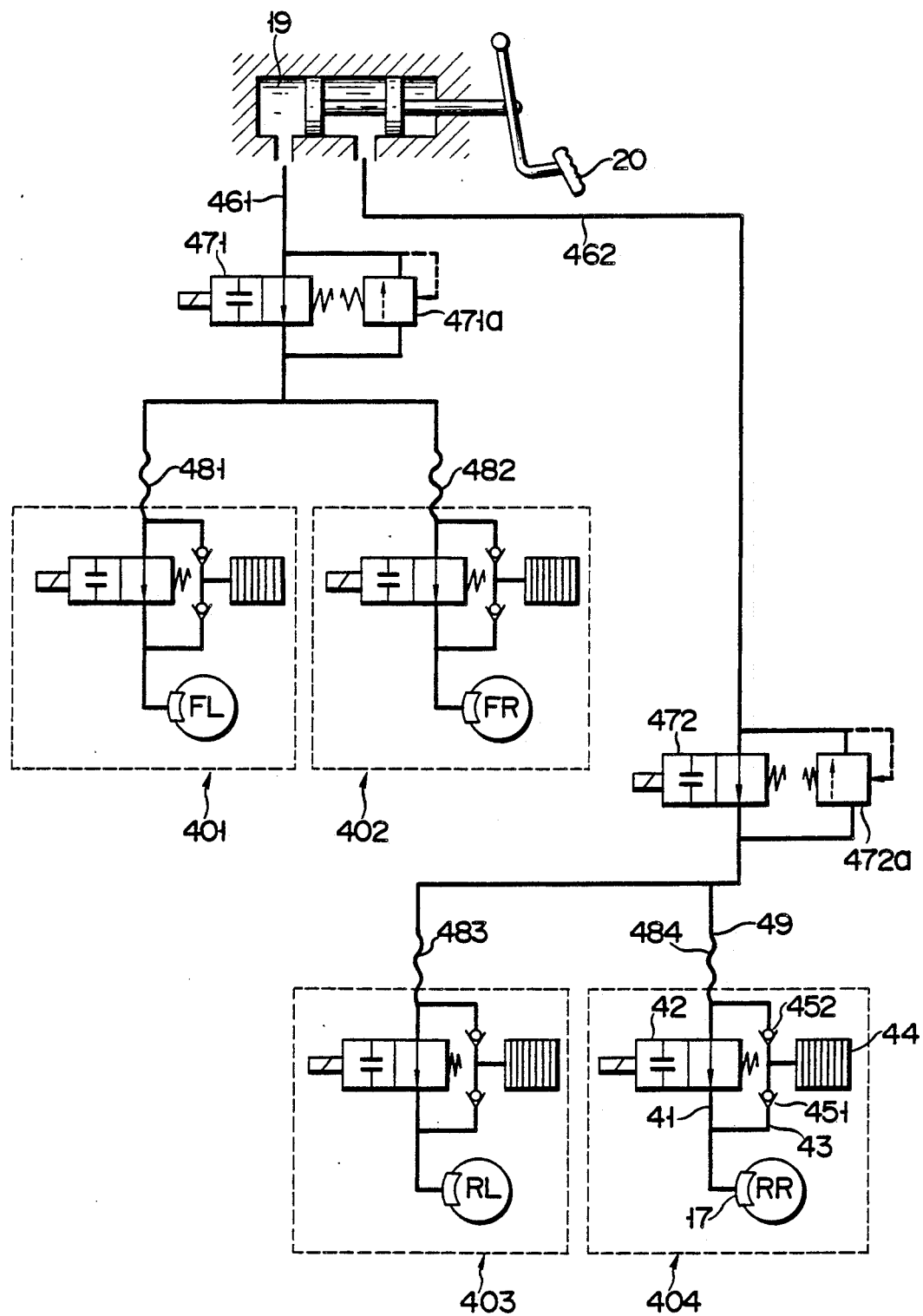
FIG. 10 shows the control system of the control apparatus according to a third embodiment of the invention.

FIG. 10 shows the entire system of the braking device according to a third embodiment of this invention. Braking devices 401 to 404 are provided for the wheels FL, FR, RL and RR, respectively. The braking devices all have the same structure so a description will be given of the right rear wheel (RR) device only. Brake fluid is provided from master cylinder 19 to wheel cylinder 17 of braking device 404. Control valve 42 is provided in fluid passage 41 along which brake fluid is conducted to wheel cylinder 17.

Fluid passage 43 is provided as a bypass around control valve 42 and piezoelectric piston device 44 is provided in fluid passage 43 along with check valves 451 and 452 so that only the fluid discharged from wheel cylinder 17 is supplied to master cylinder 19 by piezoelectric piston device 44.

Braking devices 401 to 404 are divided into front and rear wheel systems and brake fluid is supplied from master cylinder 19 via first pipes 461 and 462 in which cut-off valves 471 and 472 are respectively provided. First pipes 461 and 462 are fastened to the vehicle body and are made of metal. Second pipes 481 to 484, which connect first pipes 461, 462 with braking devices 401 to 404, are made of an elastic material such as rubber. When brake pedal 20 is operated, cut-off valves 471, 472 are open and the normal braking operation is performed.

When, however, an abrupt strong braking force is applied, the wheels will lock and slippage will occur. When, for example, such slippage occurs in the right rear wheel RR, control valve 42 closes in response to a wheel-lock detection signal. At the same time or slightly later when control valve 42 closes, cut-off valve 472 closes as well. When a pulsed voltage is supplied to the piezoelectric elements of piston device 44 in braking device 404, piston device 44 repeatedly expands and contracts to discharge the fluid in wheel cylinder 17 via check valve 451 to second pipe 484, thereby reducing pressure in wheel cylinder 17 and unlocking wheel RR.

The fluid discharged through check valve 452 to second pipe 484 is held in that pipe because cut-off valve 472 is closed. As second pipe 484 has a flexible construction, it expands to accomodate the fluid and constitutes hydraulic accumulator 49. When there is little slippage in the wheel, control valve 42 opens and the brake fluid stored in hydraulic accumulator 49 is supplied to wheel cylinder 17 and the braking force is once more increased. In this way strong and weak braking forces are repeatedly applied to effectively reduce slippage to an optimal minimum.

Cut-off valve 472 is opened when a strong braking pressure is released so that when brake pedal 20 is released, the fluid in wheel cylinders 17 is returned to master cylinder 19 through this cut-off valve. If for any reason cut-off valve does not return to its original position, pressure-reducing valves 471a and 472a operate to eliminate the pressure in wheel cylinder 17.

Figure 11:
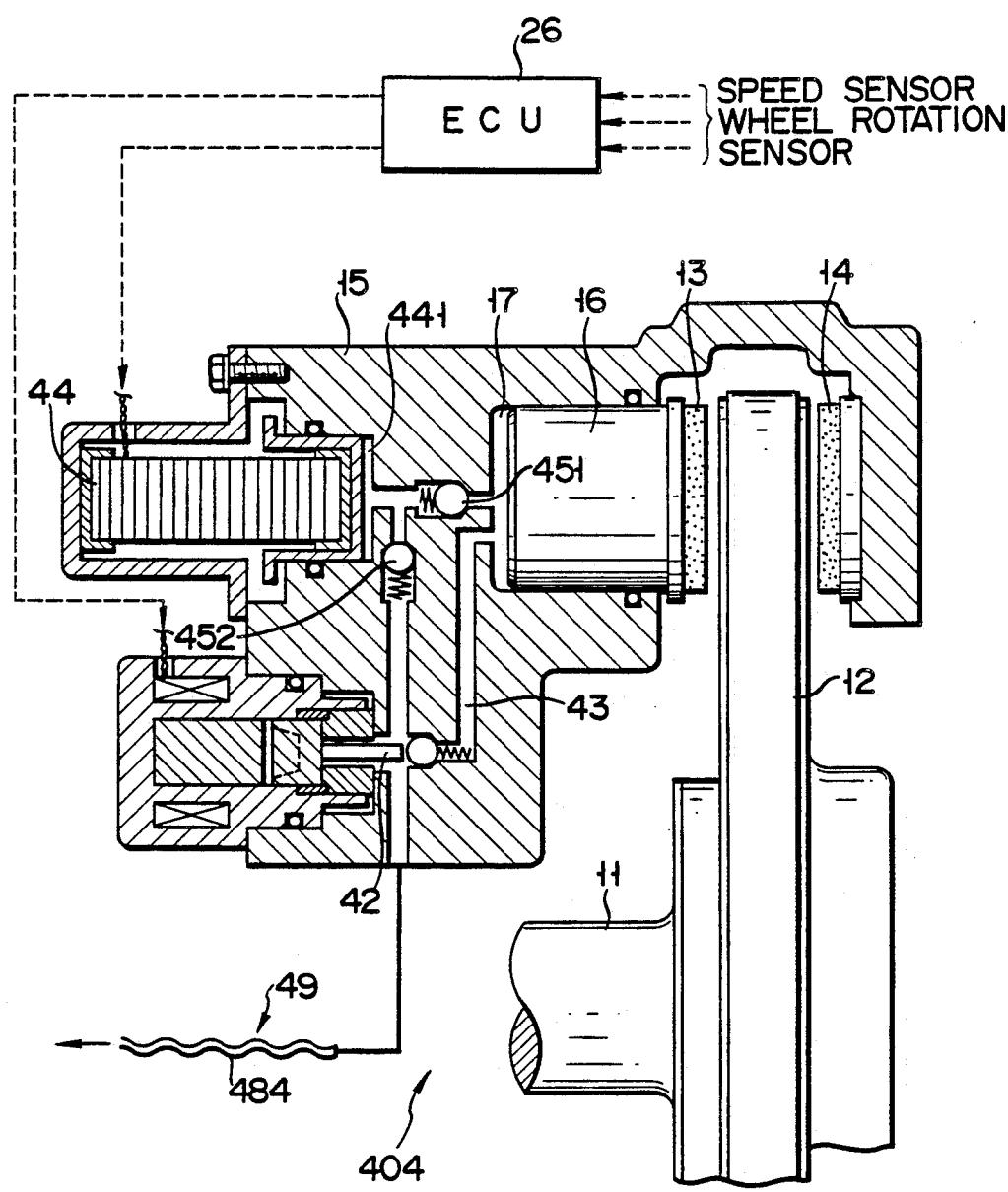
FIG. 11 is a cross section of the above control apparatus.

FIG. 11 shows a detailed example of the construction of braking device 404. The same as with the embodiment shown in FIG. 1 wheel cylinder 17 is formed inside brake caliper 15, piezoelectric piston device 44 comprising a plurality of laminated piezoelectric elements is located in fluid pressure chamber 441, which is coupled with wheel cylinder 17 through check valve 451, and with second pipe 484 through check valve 452. Second pipe 484 is coupled with wheel cylinder 17 via fluid passage 43 in which control valve 42 is provided. Valve 42 is a ball valve that is normally held open by a spring and is closed by an actuator which is driven by an excitation current to close passage 43. Piston device 44 and control valve 42, etc. are controlled by commands from control unit 26.

Figure 12:
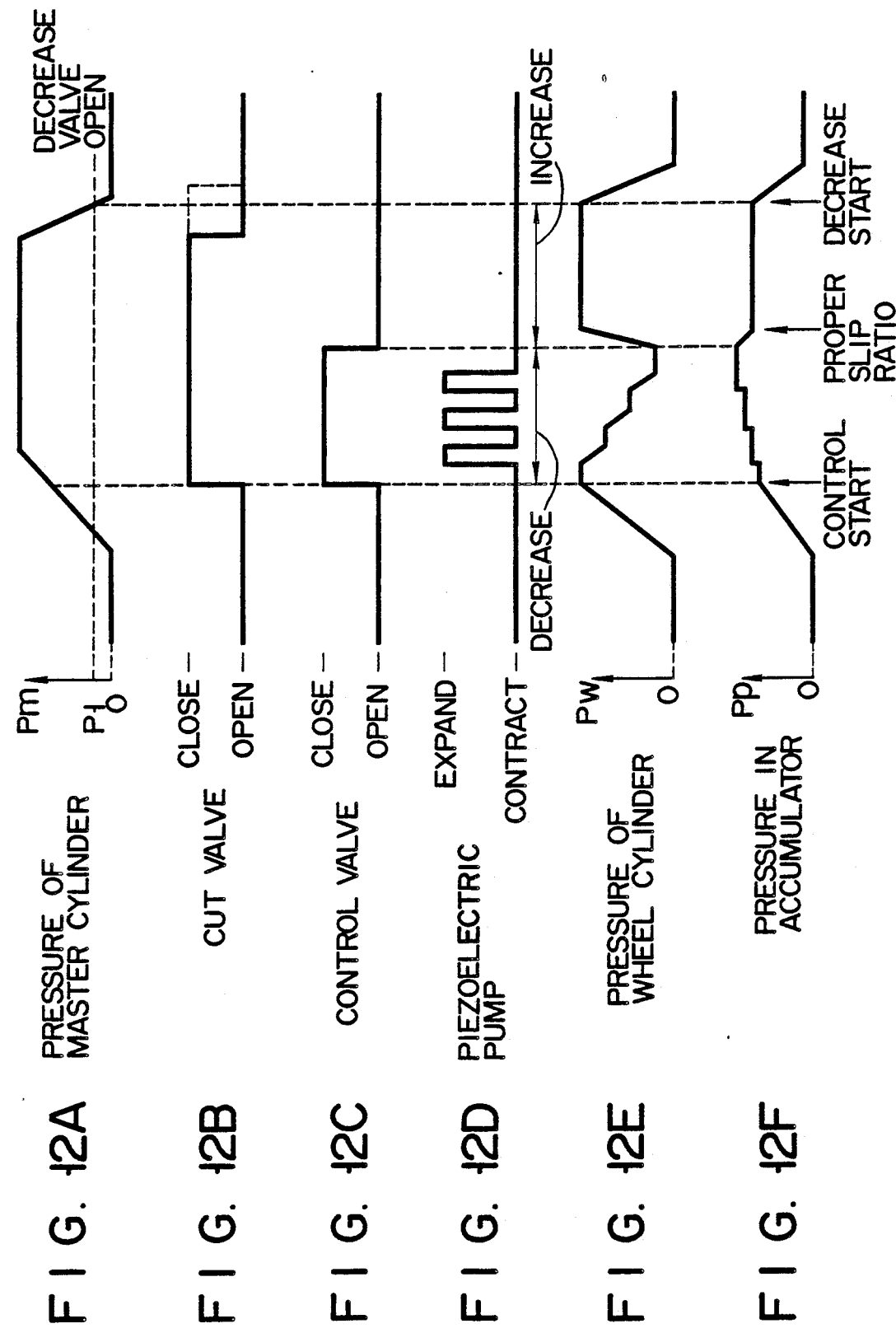
FIGS. 12A to 12F are time charts showing the operation of the above control apparatus.
Figure 13:
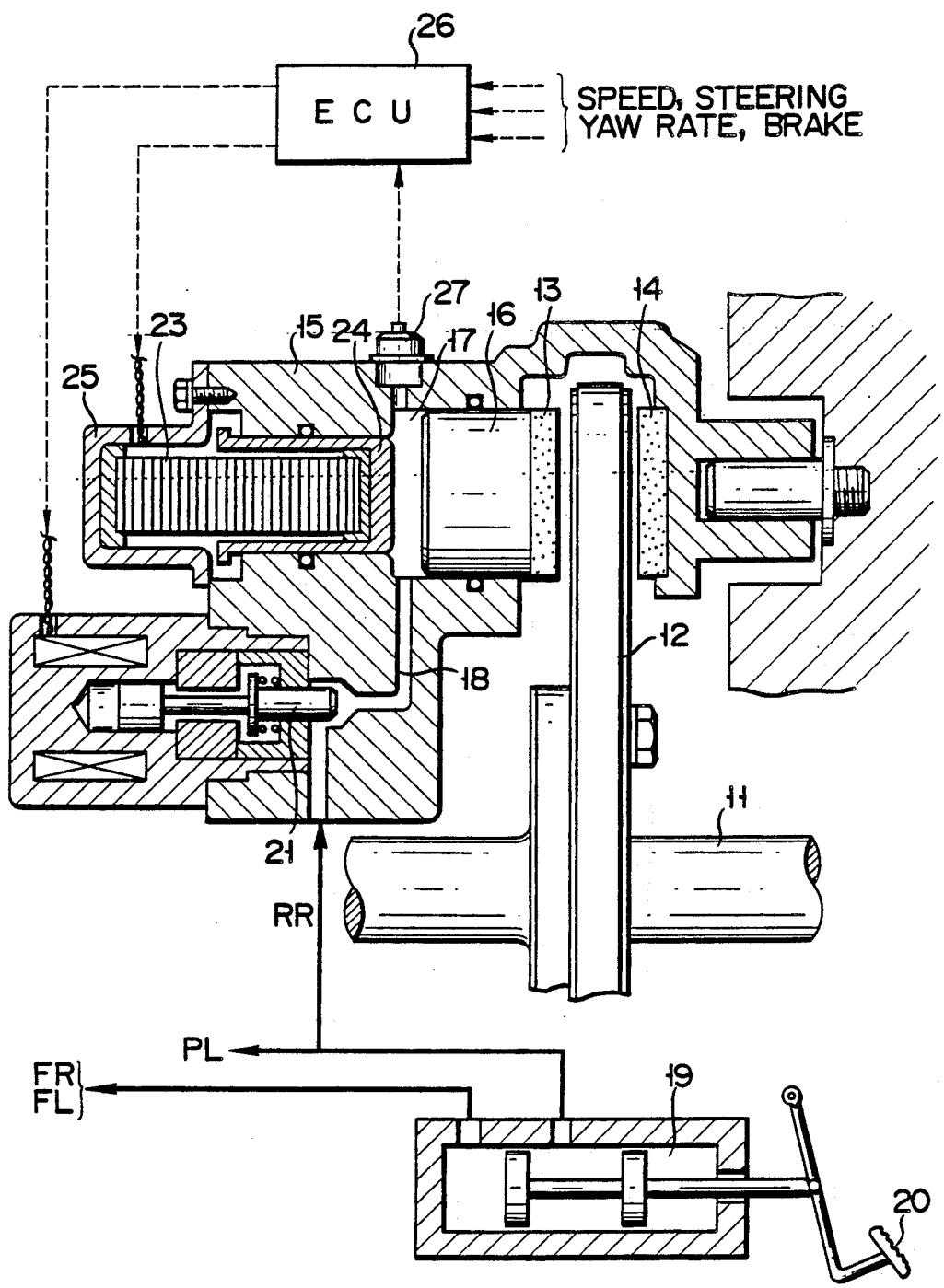
FIG. 13 is a cross section of the control apparatus according to a fourth embodiment in which roll, in particular, is controlled.

When brake pedal 20 is operated, pressure in master cylinder 19 rises as shown in FIG. 12A and, if in this state it is detected that wheel slippage has occurred, the control operation begins and, as shown in FIGS. 12B and 12C, the cut-off valve and the control valve close. This results in wheel cylinder 17 being closed off into a restricted space and accumulator 49 being formed.

Piezoelectric piston device 44 receives a pulse voltage such as that shown in FIG. 12D and expands and contracts so that the fluid in wheel cylinder 17 is sent to accumulator 49. This pumping action results in the pressure in wheel cylinder 17 decreasing as shown in FIG. 12E and, when the slippage of the wheel has decreased to a suitable value, the power supplied to piezoelectric piston device 44 is cut off. When the slippage decreases still further, the control valve opens as shown in FIG. 12C, the fluid in accumulator 49 is supplied to wheel cylinder 17 and the pressure wheel cylinder 17 rises again. If slippage occurs again, the process is repeated.

During this braking process, the pressure in accumulator 49 varies as shown in FIG. 12F. Then brake pedal 20 is released, pressure in master cylinder 19 goes down, the cut-off valve opens, and pressure in wheel cylinder 17 goes down, thereby ending the braking operation.

The piezoelectric device, which is constructed of a plurality of thin-plate laminated piezoelectric elements, expands and contracts with the application of a power voltage to act as a piston. The stroke of this piston action is, however, comparatively short so the amount of control that is possible is limited. With the repeated expansions and contractions resulting from the application of a pulse voltage, it is possible to move the brake fluid and responsively alter the pressure in wheel cylinder 17.

Figure 14:
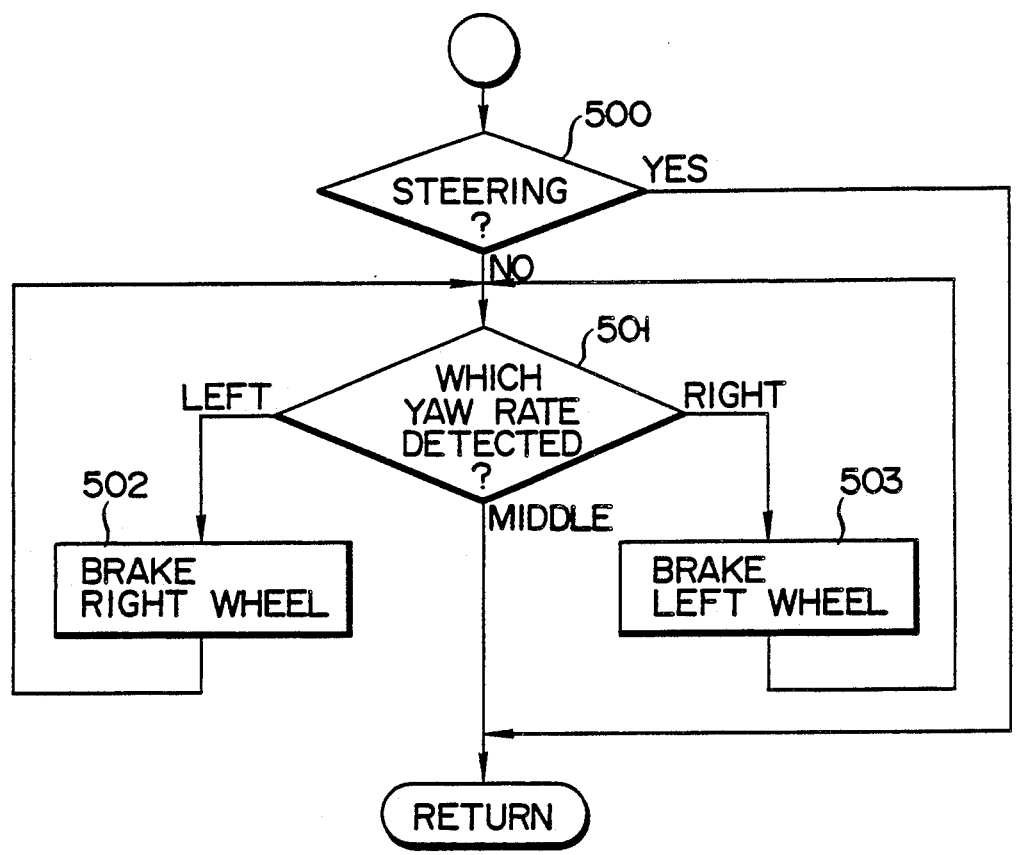
FIGS. 14 and 15 are flowcharts showing the operation of the above embodiment.

With the braking device shown in FIGS. 1 and 8, check valve 22 for bypassing control valve 21 was provided in fluid passage 18. However, it is not necessary to provide the bypass passage in which check valve 22 was located. For example, a construction such as that shown in FIG. 14 is also possible. In this example the same parts have been given the same reference numerals and a description of which has been omitted.

FIG. 14 shows the control flow when roll control is performed using the above braking device. In step 500 it is determined whether the steering wheel has been operated and, if it has, the control routine is finished. If it has not, on the other hand, and if it is determined that the vehicle is going straight, control advances to step 501 and the signal from the roll sensor for detecting lateral roll is detected. If lateral roll is not detected in step 501, the control routine is finished. If a right or left lateral roll is detected by the roll sensor, the control goes to step 502 or 503.

When, for example, the vehicle is blown to the right by the wind, control advances from step 501 to step 502 and, when the vehicle is blown to the left, control advances from step 501 to 503. In step 502 the braking devices of the left side wheels are activated and in step 503 the right side to prevent rolling.

Figure 15:
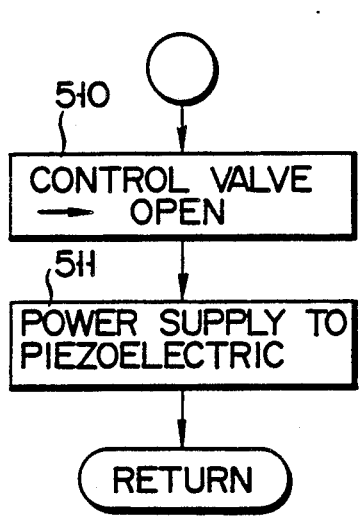

This kind of braking action is carried out in step 510 shown in FIG. 15 by sending a braking command to close control valve 21 of the braking device and then, as shown in step 511, supplying a high voltage to piezoelectric device 23 which then expands increasing the pressure inside wheel cylinder 17.

Figure 16:
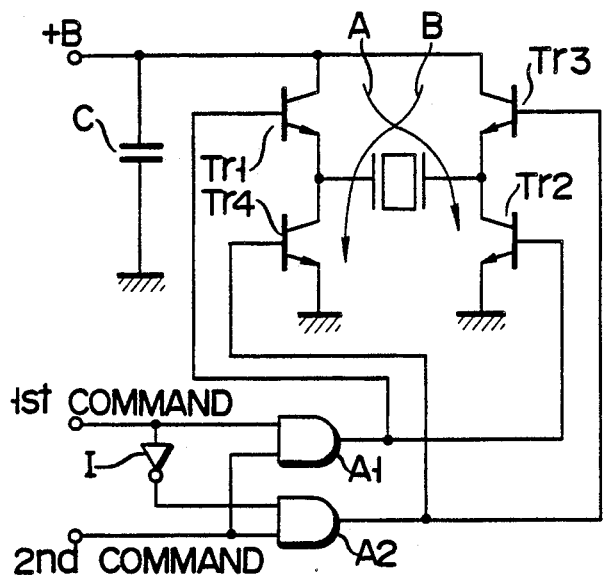
FIG. 16 is a circuit diagram of the circuit for controlling the voltage supplied to the piezoelectric elements which comprise the piston device of the above control apparatus.

FIG. 16 shows an example of a circuit for supplying a voltage to a plurality of piezoelectric elements 231, 232, ... of piezoelectric 23. In this case the piezoelements are considered as one unit. Voltage source +B is connected to capacitor C where a prescribed power voltage is stored for driving piezoelectric device 23. The commands for increasing and decreasing pressure in wheel cylinder 17 are supplied via input terminal T1. At high level the first command signal is an increase-pressure command and at low level it is a decrease-pressure command. This first command signal is supplied to AND circuit A1 and, via inverter I, to AND circuit A2.

The second command signal, which controls the supply of power to piezoelectric device 23, is supplied to the second input terminal T2 as a gate signal for AND circuits A1 and A2. When the first command signal is at the high level while the second command signal is being applied, an output signal is generated from AND circuit A1 and supplied to the bases of transistors Tr1 and Tr2 so that power is supplied to piezoelectric device 23 in the direction of arrow A. Piezoelectric device 23 then expands and the pressure in wheel cylinder 17 rises.

When the first command signal is at the low level while the second command signal is being applied, an output signal is generated from AND circuit A2 and supplied to the bases of transistors Tr3 and Tr4 so that power is supplied to piezoelectric device 23 in the direction of arrow B. Piezoelectric device 23 then contracts and the pressure in wheel cylinder 17 decreases.

This second command signal may be at the high level when rolling is detected by the roll sensor and it may also be a pulse signal. If this command signal is a pulse signal, the amount of power supplied to piezoelectric device 23 is controlled by the pulse interval, or duty, and the amount of deflection of piezoelectric device 23 is determined by the amount of power. This makes it possible to exert even finer control on the braking force and, when roll is being controlled, the braking force can be set in response to the level of the detection signal from the roll sensor. It is also possible to use effective feedback control of the braking.

It is also possible to apply a braking force to only one side by using a command from a switch, etc. With this kind of control means it is particularly possible to control the movement of the vehicle with a small turning radius.

What is claimed is:

1. A braking control apparatus for a vehicle, comprising:
   a wheel cylinder formed in a brake caliper of each wheel of the vehicle and having a brake piston set therein for applying a braking force on the wheel as the result of brake fluid pressure in said wheel cylinder;
   a fluid passage formed in said brake caliper for conducting brake fluid from a master cylinder to said wheel cylinder in response to operation of a brake pedal;
   a control valve for opening and closing said fluid passage and thereby defining the volume of said wheel cylinder;
   a piezoelectric device comprising a plurality of thin-plate laminated piezoelectric elements and positioned in a chamber coupled with said wheel cylinder, for expanding and contracting upon the application of a voltage to said piezoelectric elements, to thereby vary the volume of a pressure chamber defined within said chamber by said piezoelectric device;
   cut-off valves provided in first pipes conducting brake fluid from the master cylinder which produces a fluid pressure responsive to the operation of the brake pedal;
   an accumulator formed in second pipes which conduct brake fluid from said first pipes to the wheel cylinders, when said cut-off valves are closed;
   a first check valve provided between said pressure chamber, the volume of which is varied by the expansion and contraction of said piezoelectric device and said wheel cylinder, said first check valve allowing brake fluid to pass from said wheel cylinder to said pressure chamber when the volume of said pressure chamber is increased;
   a second check valve for allowing brake fluid to pass from said pressure chamber to said accumulator when the volume of said pressure chamber is decreased; and
   control means for expanding and contracting said piezoelectric device when said cut-off valves and said control valve are closed, to thereby supply brake fluid in said wheel cylinder to said accumulator and maintain the brake fluid pressure in said accumulator, said control means opening said control valve when brake fluid is stored in said accumulator, to thereby supply brake fluid in said accumulator to said wheel cylinder.

2. An apparatus according to claim 1, wherein said second pipes, which form said accumulator, are constructed of an elastic material.

3. An apparatus according to claim 1, wherein, when the pressure in said wheel cylinder increases due to an operation of the brake pedal and it is detected that any of the wheels is in a locked state, said control means closes the cut-off valve arranged in the first pipe conducting brake fluid from the master cylinder to the wheel cylinder corresponding to the wheel which is locked, as well as the control valve arranged in the fluid passage conducting brake fluid to said wheel cylinder, so that said piezoelectric device is repeatedly expanded and contracted to thereby supply brake fluid in said wheel cylinder to said accumulator; and said control means opens said control valve when said wheel is released from a locked state, to thereby increase the brake fluid pressure in said wheel cylinder.

4. A braking control apparatus for a vehicle, comprising:
   a wheel cylinder formed in a brake caliper of each wheel of the vehicle and having a brake piston set therein for applying a braking force on the wheel as the result of brake fluid pressure in said wheel cylinder;
   a fluid passage formed in said brake caliper for conducting brake fluid from a master cylinder to said wheel cylinder in response to operation of a brake pedal;
   a piezoelectric device comprising a plurality of thin-plate laminated piezoelectric elements and positioned in a chamber coupled with said wheel cylinder, for expanding and contracting upon the application of a control signal to said piezoelectric elements, to thereby vary the volume of a pressure chamber defined within said chamber by said piezoelectric device, and for generating an electric monitor signal corresponding to the pressure in the pressure chamber when the brake pedal is operated; and
   monitor means for comparing the electric monitor signal from said piezoelectric device and a set signal, and confirming the normal operation of said piezoelectric device.

5. An apparatus according to claim 4 further comprising:
   a control valve for opening and closing said fluid passage and thereby defining the volume of said wheel cylinder; and
   control means for detecting the running state of the vehicle and, based on a detection signal, expanding and contracting said piezoelectric device after closing said control valve to vary the brake fluid pressure in said wheel cylinder.

* * * * *